May 7, 1946.  E. C. WAHLBERG  2,399,772
ENGINE CONTROL
Filed July 6, 1943   2 Sheets-Sheet 2

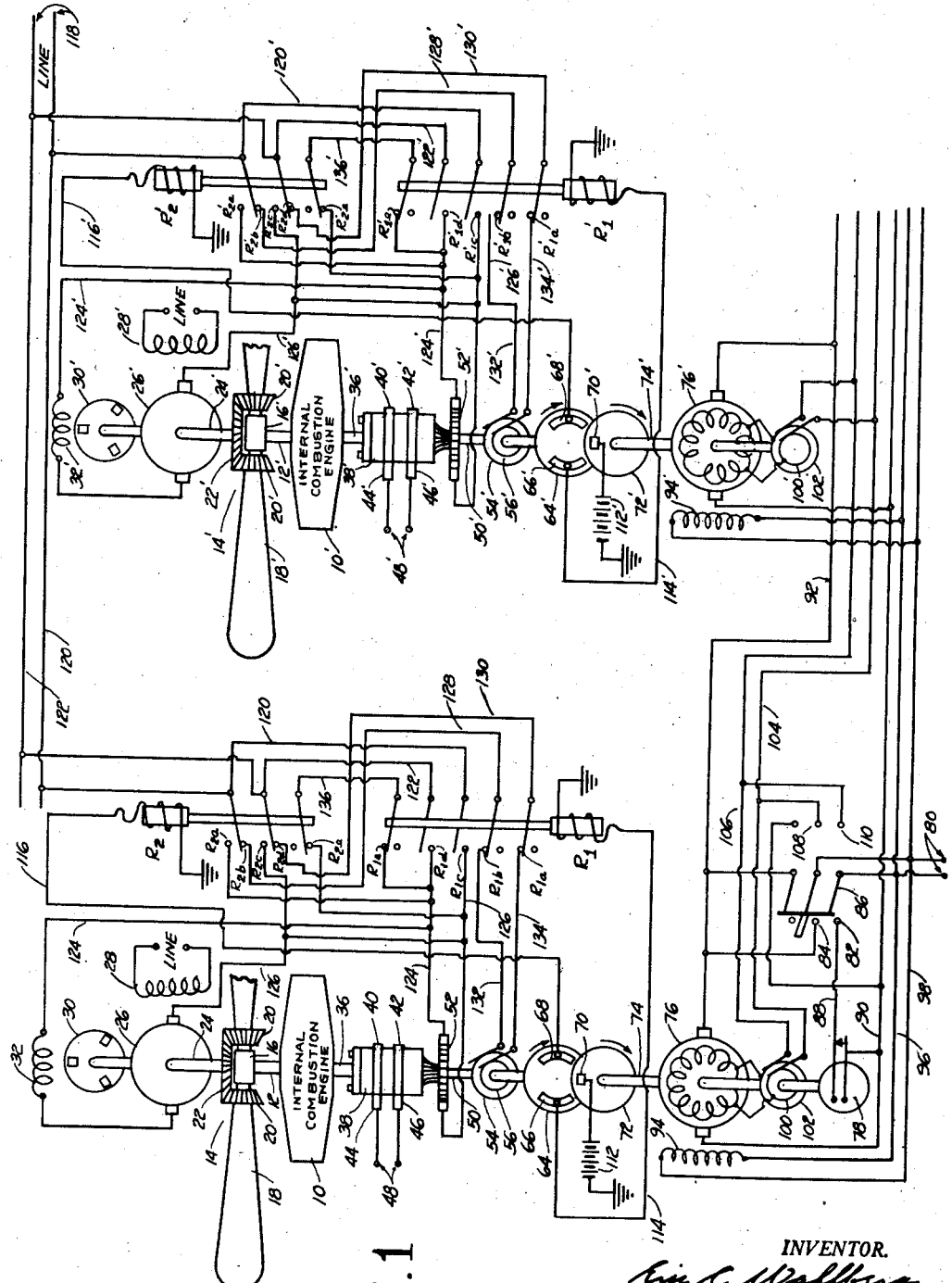

INVENTOR.
Eric C. Wahlberg
BY Thomas C. Betts
his ATTORNEY

Patented May 7, 1946

2,399,772

UNITED STATES PATENT OFFICE 2,399,772

ENGINE CONTROL

Eric C. Wahlberg, Stamford, Conn., assignor to Electrolux Corporation, Old Greenwich, Conn., a corporation of Delaware Application July 6, 1943, Serial No. 493,635

19 Claims. (Cl. 60—97)

My invention relates to means for synchronizing the speeds of a plurality of prime movers, and more particularly for synchronizing the speeds of the different internal combustion engines in a multi-motored aircraft.

A further object of my invention is to not only synchronize the speeds of the motors, but to maintain the respective crankshafts in substantially fixed angular relation to each other so that corresponding blades of the respective propellers driven thereby remain at all times substantially parallel to each other.

Further objects and advantages of my invention will be apparent from the following description considered in connection with the accompanying drawings, which form a part of this specification and of which:

Fig. 1 is a more or less diagrammatic view of a preferred embodiment of my invention;

Figure 4:
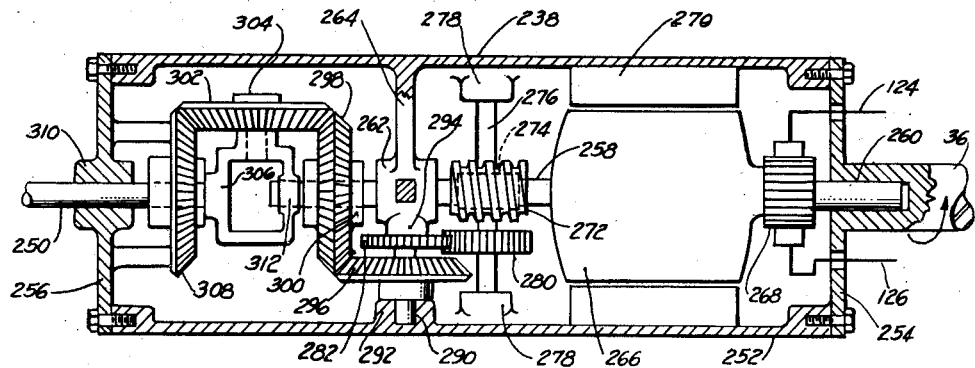
Fig. 4 is a cross sectional view of a further form of follow-up motor.

Referring more particularly to Fig. 1, reference character 10 designates an internal combustion engine, the crankshaft of which is integral with or directly coupled to a propeller shaft 12. Shaft 12 carries a variable pitch propeller, designated generally by reference character 14. The propeller includes a hub 16 in which are rotatably mounted blades 18. Each blade carries a beveled gear 20 which meshes with a beveled gear 22 mounted on the shaft 24 of a propeller pitch control motor 26. Motor 26 may be any suitable electric or hydraulic motor and, as is well known, is mounted in the hub of the propeller. As shown, it is an electric motor provided with a separately excited field 28, but a series or shunt wound motor might be employed. Associated with motor 26 is a magnetic brake 30, the brake normally preventing relative rotation between the field and the armature of the motor. The brake has a solenoid 32 connected in series with an armature lead, which coil of course is energized whenever current is supplied to the armature, and when energized, serves to release the brake.

Figure 2:
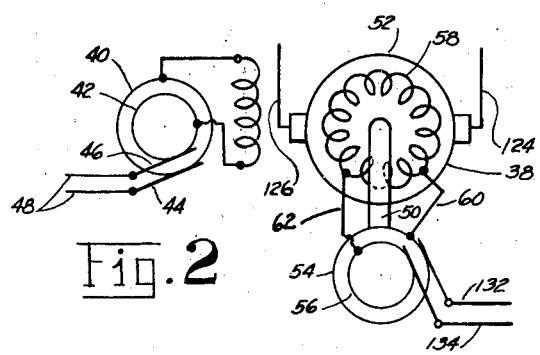
Fig. 2 is a schematic wiring diagram of a follow-up motor shown in Fig. 1.

Directly connected to an extension 36 of the crankshaft, or to the tachometer connection of the motor 10 is the housing of a follow-up motor 38, having a separately excited field. Inasmuch as this housing rotates with the shaft 38, it is necessary to provide slip rings 40 and 42 cooperating with brushes 44 and 46 for supplying excitation current from the D. C. line 48. The armature shaft 50 of the motor 38 carries a commutator 52 and a pair of slip rings 54 and 56. The motor 38 is of the type disclosed in my copending application Serial No. 428,018, filed January 24, 1942, and a schematic wiring diagram thereof is shown in Fig. 2. From this it will be seen that the armature winding 58 is provided with taps 60 and 62 which lead to the slip rings 54 and 56, respectively. As is more fully explained in my above-identified application, when direct current is applied to the armature winding through the taps 60 and 62, fixed poles are established in the armature which, in cooperation with the fixed poles normally established in the separately excited field, serve to angularly position the armature with respect to the field and to magnetically lock the armature in this position.

Mounted on the armature shaft 50 is a disc 64 which carries a pair of peripherally spaced contacts 66 and 68. These contacts cooperate with a single contact 70 on a disc 72, which is mounted concentrically with disc 64 on the armature shaft 74 of an electric motor 76. Motor 76 is of the same type as follow-up motor 38, but the field thereof is at all times stationary. Armature shaft 74 also carries a suitable well known type of speed governor 78 which is connected in series with the armature circuit of the motor in order to hold the speed of the motor constant by repeatedly opening and closing the circuit.

Armature current for the motor 76 is supplied from the direct current line 80 through the poles 82 and 84 of a triple pole double throw switch 86. Pole 82 is connected by means of a conductor 88 to one terminal of the governor 78, while the other terminal of the governor is connected to one of the armature brushes by means of a conductor 90. A conductor 92 connects the pole 84 of the switch directly with the other armature brush. Excitation current for the field winding 94 is supplied from the line 80 ahead of the switch 86 through the conductors 96 and 98. The slip rings 100 and 102 of the motor 76 are connected by means of conductors 104 and 106 with poles 108 and 110 of the switch 86, whereby line current may be applied to the slip rings and consequently to spaced points in the armature of motor 76 for positioning the armature with respect to the field, as above described in connection with the follow-up motor shown in Fig. 2. The armature leads 90 and 92 are connected across a third pole of the switch 86 so that, when the switch is in the right hand position, in which line current is applied to the slip rings 100 and 102, the armature is short circuited to provide dynamic braking.

Contact 70 on disc 72 is connected through a suitable slip ring (not shown) with a source of electric current, such as the battery 112, the other side of which is grounded. Contact 66 on disc 64 is connected by means of a conductor 114 with the solenoid of a relay R₁, the other side of which is grounded. Contact 68 is connected by means of a conductor 116 with the solenoid of a relay R₂, the other side of which is grounded. Relay R₂ has active contacts R₂ₐ, R₂ᵦ, R₂c, R₂d and R₂ₑ. One side of a direct current line 118 is connected by means of a conductor 120 with the blade of relay R₂ which cooperates with contacts R₂ₐ and R₂ᵦ while the other side is connected by a conductor 122 with the blade which cooperates with the contacts R₂c and R₂d. Conductors 124 and 126 connect the contacts R₂ₐ and R₂c, respectively, with the commutator brushes of the follow-up motor 38 and with the armature circuit of the propeller pitch control motor 26.

The relay R₁ is provided with active contacts R₁ₐ, R₁ᵦ, R₁c, R₁d and R₁ₑ. Conductors 128 and 130 connect the contacts R₂ᵦ and R₂d of relay R₂ with the blades of relay R₁ which cooperate with the contacts R₁ᵦ and R₁ₐ, respectively. The two latter contacts are connected by conductors 132 and 134, respectively, with the slip rings 54 and 56 of the follow-up motor. The line conductors 120 and 122 are also connected to the blades of relay R₁ which cooperate with the contacts R₁c and R₁d, respectively. Armature leads 124 and 126, which supply current to both the follow-up motor 38 and the propeller pitch control motor 26 are connected to contacts R₁d and R₁c, respectively.

The armature lead 124 is also connected to contact R₁ₑ while the armature lead 126 is connected to contact R₂ₑ, and the blades cooperating with these two contacts are connected together by means of a conductor 136, whereby the armatures of the motors 26 and 38 are short circuited to provide dynamic braking when both the relays R₁ and R₂ are deenergized.

Reference character 10' designates another internal combustion engine which forms part of a system which is identical, except in one respect, with that above described, corresponding parts of the system being designated by the same reference characters primed. The only difference between the two systems is that the shaft 74' of constant speed motor 76' does not carry a speed governor corresponding to governor 78. This is not necessary because the slip rings 100' and 102' of motor 76' are connected to the conductors 104 and 106, respectively. This provides an alternating current circuit when the motors are running which maintains the motors 76 and 76' in synchronism, as is explained in my above-identified application Serial No. 428,018. While a three phase tie is illustrated in the aforesaid application, I have determined that synchronous operation may be obtained with a single phase tie, as is explained in my copending application Serial No. 472,464, filed January 15, 1943.

The above described system is repeated for every internal combustion engine in the plane. Consequently, in a four engine ship, there would be four of these systems tied together in parallel in the same manner as here indicated for the motors 10 and 10'. The operation of the above described device is as follows.

The several internal combustion motors are started independently in the usual manner and are preferably warmed up before electric current is supplied to any of the conductors shown in Fig. 1. The motors are then brought to approximately the same speeds by manipulating their respective throttle controls and current is supplied to the lines 48, 98 and 118 by closing suitable switches. The switch 86 is then closed in its right hand position so as to supply current through the contacts 108 and 110, the conductors 104 and 106 and the slip rings 100 and 102 so as to angularly position the armatures of the constant speed motors 76 and 76', with respect to each other. Consequently, the contacts 70 and 70' on the discs 72 and 72' are likewise lined up with respect to each other. The switch 86 is then thrown to its left hand position, thus supplying armature current from the contacts 82 and 84 to the conductors 88 and 92. Inasmuch as the motor 76 is stationary, the make and break contact in the speed governor 78 is closed and current is supplied through the conductor 96. Consequently, the motors 76 and 76' start and run in synchronism due to the A. C. tie between their armatures provided by the conductors 104 and 106. This holds the two motors in step so that the contacts 70 and 70' are always in the same position relative to each other. The motors 76 and 76' accelerate until they reach the speed for which the governor 78 is set, whereupon the governor repeatedly introduces resistance in the armature circuit so as to maintain the motors at the desired speed.

At the same time the discs 64 and 64' are being driven at a speed determined by the speed of the internal combustion engines 10 and 10', respectively. Assume that when the motor 76 gets up to the desired speed, the contact 70 is in the position shown relative to the contacts 66 and 68, that is, midway between the two latter contacts. Under these conditions neither of the relays will be energized and line current will flow through the conductors 120 and 122, contacts R₂ᵦ and R₂d, conductors 128 and 130, contacts R₁ᵦ and R₁ₐ, conductors 132 and 134, slip rings 54 and 56 and taps 60 and 62 to the armature winding 58 of the follow-up motor 38. The field of this motor being separately excited from the line 48, the armature is therefore magnetically locked in a definite angular position with respect to the field and the field and armature rotate at the same speed as the shaft 36 which is connected to the internal combustion engine. At the same time, contacts R₂ₐ and R₂c and contacts R₁c and R₁d are all open and consequently no current is supplied to the commutator 52 of the follow-up motor or to the armature of the propeller pitch control motor 26. Assume further that the internal combustion engine is rotating at such a speed as to drive the disc 64 faster than the disc 72 is rotating. Under these conditions the contact 66 will catch up and make contact with the contact 70. There is thus established a circuit from the battery 112 through the contacts 70 and 66 and the conductor 114 to energize the relay R₁. This opens the contact R₁ₑ, thus opening the dynamic braking circuit. At the same time contacts R₁ₐ and R₁ᵦ are opened, thus interrupting the supply of current to the slip rings 54 and 56 of the follow-up motor, which frees the armature of this motor from the field. Actuation of relay R₁ closes contacts R₁d and R₁c and consequently line current is supplied through the conductors 124 and 126 to the armatures of both the follow-up motor 38 and the propeller pitch control motor 26, and the magnetic brake 30 of the latter motor is released. The motor 26 thus rotates in the proper direction to increase the pitch of the blades 18, thus increasing the load on the engine 10, which results in a decrease in the speed of this engine. At the same time the armature shaft 50 of the follow-up motor 38 is turned a fraction of a revolution in a proper direction with respect to its field so as to cause the armature shaft to rotate slower than the shaft 36. This reduces the speed of the disc 64 thus causing the contact 66 thereon to momentarily lag behind the contact 70, which rotates with the disc 72. The solenoid circuit of the relay R1 is thus opened and the relay is deenergized. This reestablishes the circuits as they were before and consequently the supply of current to the armature circuits of the motors 26 and 38 is interrupted, the armature circuits of both motors are short-circuited to quickly stop them by dynamic braking, and direct current is applied to the slip rings 54 and 56 of the follow-up motor. This returns the armature of this motor to the angular position which it previously occupied with respect to the field, thus causing the armature shaft 50 to rotate for a fraction of a revolution at a speed greater than that of the field. This causes the contact 66 to again catch up to the contact 70 and the above described cycle of operation is repeated.

Eventually, the propeller pitch control motor will change the pitch of the blades 18 sufficiently so that the engine 10 will be rotating slightly slower than the constant speed of the motor 76. When this occurs, the contact 70 will catch up to the contact 68 and energize the relay R2. This opens the contacts R2b, R2d and R2e, thus interrupting the supply of current to the slip rings 54 and 56 and opening the dynamic braking circuit. At the same time the contacts R2a and R2c are closed, thus supplying line current to the armature leads 124 and 126 of the motors 26 and 38, but with reverse polarity with respect to the connections established by the actuation of relay R1. This causes the propeller pitch control motor 26 to rotate in a direction which decreases the pitch of the blades, thus reducing the load on the engine and permitting the latter to accelerate slightly. At the same time, the armature of the follow-up motor 38 rotates relative to its field in a direction so as to increase the speed of the armature shaft 50 with respect to the shaft 36, thus rotating the contact 68 faster than the contact 70 and opening the circuit of the relay R2. Current is then applied to the slip rings 54 and 56 and the armature of the follow-up motor again is angularly positioned with respect to the field. This causes the contacts 68 and 70 to again close, with the result that the propeller pitch is further changed to increase the speed of the engine. This goes on until the engine speed is increased sufficiently for the contact 66 to catch up to the contact 70.

Consequently, the engine 10 hunts slightly between the two speeds, as above described, but this variation in speed is very slight and disc 64, as a result of the angular positioning of the follow-up motor after every change in propeller pitch, never gets out of angular alignment with respect to the propeller by an amount greater than the angle between the contacts 66 and 68.

The same control is being effected by the system associated with the engine 10', and inasmuch as the contacts 70 and 70' are maintained in step by the synchronous rotation of the motors 76 and 76', the engines 10 and 10' are not only caused to operate synchronously, but in addition, the blades of the propellers of the respective motors are maintained parallel to each other within the limits determined by the angle between the contacts 66 and 68, which may be a matter of plus or minus 5°. The hunting above referred to actually is not at all objectionable considering that under even the best flight conditions any regulating system for a plurality of engines will necessarily be continuously operating in order to keep the engines running at synchronous speed. Such hunting, however, can be eliminated by the use of the follow-up motors shown in Figs. 3 and 4, but with the sacrifice of the ability of the system to maintain the propeller blades in substantial parallelism.

Figure 3:
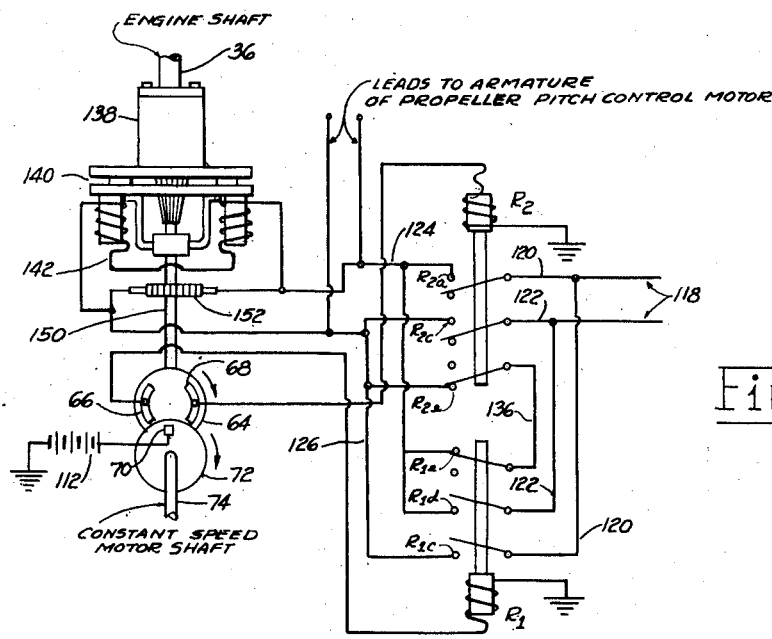
Fig. 3 is a diagrammatic view of another form of follow-up motor, together with a portion of a wiring diagram similar to that shown in Fig. 1.

In Fig. 3 the follow-up motor 138 replaces the follow-up motor 38 shown in Fig. 1 and may be any standard type of direct current motor, except of course that the housing thereof is connected so as to be rotated by the shaft 36. This motor is provided with a commutator 152 which is connected to the relay circuit by the leads 124 and 126 in the same manner as shown in Fig. 1. The motor 138 is also provided with a magnetic brake shown schematically and designated by reference character 140, which serves to lock the armature shaft to the housing of the motor. The brake includes solenoids 142 which are connected in parallel with the armature leads 124 and 126 so as to be energized whenever current is supplied to the armature. The nature of brake 140 is such that it is normally engaged to lock the shaft to the housing and is disengaged by the excitation of the solenoids.

With the parts in the position shown in Fig. 3, the relays R1 and R2 are deenergized and the armature circuit is open. Assuming that the shaft 36 is rotating at a higher speed than the shaft 74, the contact 66 will catch up to the contact 70, with the result that the relay R1 is energized and current from the line 118 is supplied through the conductors 120 and 122, contacts R1c and R1d and conductors 126 and 124, respectively, to the follow-up motor 138 and to the propeller pitch control motor. This causes the latter motor to operate in the proper direction to increase the pitch and thus to slow down the internal combustion engine. At the same time, the magnetic brake 140 is released and the armature shaft 150 of the follow-up motor 138 is rotated relative to the field thereof in a direction which causes the shaft 150 to rotate for an instant slower than the shaft 36. This results in the contact 70 drawing away from the contact 66 and thus opening the circuit of relay R1. This in turn interrupts the supply of current to the propeller pitch control motor and to the follow-up motor 138. The brake 140 engages and locks the armature shaft 150 in the new position to which it has been turned with respect to the field of the follow-up motor. If the correction in the speed of the internal combustion engine was sufficient to cause it to rotate at the same speed as the disc 72, the contact 70 will remain between the contacts 66 and 68 and no further regulation will take place until the speed of the engine again changes. However, if the correction was not sufficient, the contact 66 will again catch up to the contact 70 and a further correction will be made, and this will be repeated if necessary until the speed of the shaft 36 is the same as that of the shaft 74, under which conditions the contact 70 will stay between the contacts 66 and 68. It will thus be seen that a system using a follow-up motor of this type, in theory at least, need not hunt continuously, as was the case in the system shown in Fig. 1. However, in practice, it almost invariably occurs that before the system has corrected the speed, further variations in flight conditions tend to throw the speed off again and it is necessary to be continuously changing the pitch of the propeller blades slightly in order to maintain the engine speeds constant.

A system using the follow-up motor shown in Fig. 3 is not able to keep the blades of the different propellers parallel to each other, inasmuch as the armature shaft 158 is not returned to the same angular position with respect to the shaft 36 after every regulation. Consequently, although the contacts 66 and 68 remain within a few degrees of the contact 70, the shaft 36 and hence the propeller blades may creep around with respect to the shaft 74 and consequently with respect to the propellers on the other motors. This may not constitute a serious disadvantage in some cases, but it has been found, particularly in four motor ships, that undesirable vibrations result from the blades of the different propellers getting out of angular phase relationship to each other. The system shown in Fig. 3 is entirely satisfactory for maintaining the engine in a single engine plane at a constant speed, inasmuch as the problem of synchronizing the speeds of several engines is not present.

In Fig. 4 there is shown a follow-up unit including a motor combined with a mechanical gearing and designated generally by reference character 238, which may replace the follow-up motor 138 and magnetic clutch 140 of Fig. 3. The mechanical gearing includes an irreversible worm by virtue of which the motor may rotate the shaft 250 with respect to the shaft 36, but when the motor is not energized, the shaft 250 cannot rotate relative to the shaft 36 and consequently the two shafts are locked together and rotate at the same speed. The follow-up unit 238 includes a casing 252 having end plates 254 and 256, the end plate 254 being integral with or rigidly secured to the shaft 36. An armature shaft 258 is rotatably mounted in a pilot bearing 260 and a main bearing 262 carried by a spider 264 secured within the housing. Shaft 258 carries the usual armature winding 266 and commutator 268, the former rotating between field windings 270 which are mounted within the housing 252. Mounted on armature shaft 258 is a worm 272 which engages a worm wheel 274 mounted on a transverse shaft 276. Shaft 276 is rotatably mounted in bearings 278 carried by the housing and has rigidly mounted thereon a spur gear 280 which meshes with a similar gear 282. This latter gear is fixed to a shaft 290 rotatably mounted in a bearing 292 in the housing and a bearing 294 carried by the spider 264. A beveled gear 296 is also fixed to shaft 290 and meshes with one face of a double beveled gear 298 which is rotatably mounted by means of a bearing 300 on the overhung end of armature shaft 258. The other face of gear 298 meshes with a beveled gear 302 which is rotatably mounted on a stub shaft 304 forming part of a carrier 306. Gear 302 also meshes with a beveled gear 308 which is rigidly mounted on the end plate 256. Carrier 306 is integral with or rigidly secured to the shaft 250 which is rotatably mounted in a bearing 310 in the end plate 256. Carrier 306 also is rotatably supported with respect to the armature 258 by means of a pilot bearing 312.

The above described unit operates as follows:

Let it first be assumed that the shaft 36 and consequently the housing 252 is stationary and that current is supplied through the leads 124 and 126 to cause the armature 266 to rotate relative to the field 270. This causes the worm 272 to drive the worm wheel 274 and consequently to rotate the shaft 276 and the gear 280 mounted thereon. Gear 282 is therefore rotated and this drives the shaft 290 and the gear 296. Inasmuch as this gear meshes with the beveled gear 298, the latter is rotated about the bearing 300 and causes rotation of the beveled gear 302. As gear 308 is fixed to the end plate 256, this gear cannot be driven by the gear 302 and consequently the latter gear must roll around the gear 308. This motion causes the carrier 306 and consequently the shaft 250 to rotate and thus relative rotation takes place between the shaft 250 and the shaft 36. If the shaft 36 is itself rotating, the shaft 250 is hence driven at an absolute speed which is higher or lower than that of the shaft 36, depending upon the direction of rotation of the armature.

However, if it is assumed that the housing 252 is stationary and torque is applied to the shaft 250, this shaft cannot rotate, as will be apparent from the following. If the shaft 250 did rotate, it would rotate the carrier 306 and, inasmuch as gear 308 is stationary, the gear 302, when carried in rotation by the carrier 306, would have to roll around the gear 308 and hence rotate on the stub shaft 304. This in turn would cause rotation of gear 298 which would turn gear 296, shaft 290 and spur gear 282. The rotation of gear 292 would turn gear 280, shaft 296 and worm gear 274. However, inasmuch as worm 272 and worm gear 274 constitute an irreversible worm drive, rotation of the worm gear 274 by the shaft 276 is impossible and consequently the entire gear system is locked except when the armature rotates shaft 258. Therefore, unless the motor is energized so as to drive shaft 250 either faster or slower than shaft 36, the two shafts rotate at the same speed, regardless of any load carried by shaft 250 which tends to slow it down.

If the unit 238 is substituted for the follow-up motor 138 and magnetic brake 140 in Fig. 3, it will drive the disc 64 at the same speed as the shaft 36 unless the motor of the unit 238 is energized, in which event the disc 64 will be driven either slightly faster or slower than the shaft 36. As soon as the motor of the unit 238 is deenergized, the disc 64 will again be driven at the same speed as the shaft 36 and in the same angular position relative thereto as it occupied when the motor was deenergized. Dynamic braking of the motor in the manner illustrated in Figs. 1 and 3 may be employed to quickly stop relative rotation between the armature 266 and the field 270, thus preventing overregulation due to the inertia of the rotating members.

It will thus be seen that the systems disclosed herein-above serve to maintain one or more prime movers, such as the internal combustion engines of an airplane at a constant and synchronous speed, while in addition, the system shown in Fig. 1 maintains the angular positions of the crankshafts of the several engines substantially the same, whereby the corresponding blade of the propellers driven thereby are at all times substantially parallel to each other. It will further be noted that the mechanical mechanism involved may be mounted closely adjacent to the respective engines and that the only connections necessary between the several engines constitute electric conductors. In other words, it is not necessary to transmit mechanical movement between the engines.

Another advantage of the control system in accordance with my invention is that, because of the fact that there is no positive mechanical connection between the engine and the constant speed electric motor, but only the sliding of the contacts over the discs, the system is in no manner damaged if the contact disc driven by the engine rotates at a speed differing greatly from the speed of the other disc, nor is any so-called "throw out" mechanism required to prevent such damage. Such speed differences are bound to occur during starting and stopping of the engine and may also occur during flight, particularly in war planes, where an engine may be stopped by enemy gun fire, or the wiring for the constant speed electric motor may be damaged in a similar manner.

While I have shown and described several embodiments of my invention, it is to be understood that this has been done for the purpose of illustration only and that the scope of my invention is not to be limited thereby, but is to be determined by the appended claims.

What I claim is:

1. In a system for governing the speed of a rotating member, a rotatably mounted element carrying an electric contact, a second rotatably mounted element carrying a pair of peripherally spaced electric contacts in cooperative relation with the first-mentioned contact, means for rotating one of said elements at a speed bearing a fixed ratio to the desired speed of said member, means for rotating the other of said elements at a speed bearing said fixed ratio to the actual speed of said member, and means responsive to the closing of a circuit through said first-mentioned contact and one contact of said pair for increasing the speed of said member and responsive to the closing of a circuit through said first-mentioned contact and the other contact of said pair for decreasing the speed of said member.

2. In a system for governing the speed of a rotating member, a first rotatably mounted element, means for rotating said element at a speed bearing a fixed ratio to the desired speed of said member, a second rotatably mounted element, means for rotating said second element at a speed bearing said fixed ratio to the actual speed of said member, a plurality of electric contacts carried by one of said elements, means carried by the other of said elements for closing a first circuit through one of said contacts when the speed of said member drops below said desired speed and for closing a second circuit through another of said contacts when the speed of said member increases above said desired speed, means responsive to the closing of said first circuit for increasing the speed of said member and responsive to the closing of said second circuit for decreasing the speed of said member, and means responsive to the closing of said first circuit for momentarily increasing the speed ratio of said second element relative to said member and responsive to the closing of said second circuit for momentarily decreasing the speed ratio of said second element relative to said member.

3. In a system for governing the speed of a rotating member, a first rotatably mounted element, means for rotating said element at a speed bearing a fixed ratio to the desired speed of said member, a second rotatably mounted element, rotation transmitting mechanism for rotating said second element at a speed bearing said fixed ratio to the actual speed of said member, said mechanism including a reversible electric motor having relatively rotatable armature and field structures, one of said structures being rotated by said member and the other structure rotating said second element, a plurality of electric contacts carried by one of said elements, means carried by the other of said elements for closing a first circuit through one of said contacts when the speed of said member drops below said desired speed and for closing a second circuit through another of said contacts when the speed of said member increases above said desired speed, means responsive to the closing of said first circuit for increasing the speed of said member and responsive to the closing of said second circuit for decreasing the speed of said member, and switching means connected to said reversible motor and responsive to the closing of said first circuit for causing relative rotation of said armature and field structures in a direction to increase the speed ratio of said second element relative to said member and responsive to the closing of said second circuit for causing relative rotation of said armature and field structures in a direction to decrease the speed ratio of said second element relative to said member.

4. In a system for governing the speed of a rotating member, a first rotatably mounted element, means for rotating said element at a speed bearing a fixed ratio to the desired speed of said member, a second rotatably mounted element, rotation transmitting mechanism for rotating said second element at a speed bearing said fixed ratio to the actual speed of said member, said mechanism including a reversible electric motor having relatively rotatable armature and field structures, one of said structures being rotated by said member and the other structure rotating said second element, a plurality of electric contacts carried by one of said elements, means carried by the other of said elements for closing a first circuit through one of said contacts when the speed of said member drops below said desired speed and for closing a second circuit through another of said contacts when the speed of said member increases above said desired speed, means responsive to the closing of said first circuit for increasing the speed of said member and responsive to the closing of said second circuit for decreasing the speed of said member, switching means connected to said reversible motor and responsive to the closing of said first circuit for energizing said motor so as to cause relative rotation of said armature and field structures in a direction to increase the speed ratio of said second element relative to said member and responsive to the closing of said second circuit for energizing said motor so as to cause relative rotation of said armature and field structures in a direction to decrease the speed ratio of said second element relative to said member, and means for preventing relative rotation between said armature and field structures whenever said motor is not energized to cause such relative rotation.

5. In a system for governing the speed of a rotating member, a first rotatably mounted element, means for rotating said element at a speed bearing a fixed ratio to the desired speed of said member, a second rotatably mounted element, rotation transmitting mechanism for rotating said second element at a speed bearing said fixed ratio to the actual speed of said member, said mechanism including a reversible electric motor having relatively rotatable armature and field structures, one of said structures being rotated by said member and the other structure rotating said second element, a plurality of electric contacts carried by one of said elements, means carried by the other of said elements for closing a first circuit through one of said contacts when the speed of said member drops below said desired speed and for closing a second circuit through another of said contacts when the speed of said member increases above said desired speed, means responsive to the closing of said first circuit for increasing the speed of said member and responsive to the closing of said second circuit for decreasing the speed of said member, switching means connected to said reversible motor and responsive to the closing of said first circuit for energizing said motor so as to cause relative rotation of said armature and field structures in a direction to increase the speed ratio of said second element relative to said member and responsive to the closing of said second circuit for energizing said motor so as to cause relative rotation of said armature and field structures in a direction to decrease the speed ratio of said second element relative to said member, and magnetically operated means for preventing relative rotation between said armature and field structures whenever said motor is not energized to cause such relative rotation.

6. In a system for governing the speed of a rotating member, a first rotatably mounted element, means for rotating said element at a speed bearing a fixed ratio to the desired speed of said member, a second rotatably mounted element, rotation transmitting mechanism for rotating said second element at a speed bearing said fixed ratio to the actual speed of said member, said mechanism including a reversible electric motor having relatively rotatable armature and field structures, one of said structures being rotated by said member and the other structure rotating said second element, a plurality of electric contacts carried by one of said elements, means carried by the other of said elements for closing a first circuit through one of said contacts when the speed of said member drops below said desired speed and for closing a second circuit through another of said contacts when the speed of said member increases above said desired speed, means responsive to the closing of said first circuit for increasing the speed of said member and responsive to the closing of said second circuit for decreasing the speed of said member, switching means connected to said reversible motor and responsive to the closing of said first circuit for energizing said motor so as to cause relative rotation of said armature and field structures in a direction to increase the speed ratio of said second element relative to said member and responsive to the closing of said second circuit for energizing said motor so as to cause relative rotation of said armature and field structures in a direction to decrease the speed ratio of said second element relative to said member, a magnetic clutch for releasably locking said armature and field structures together, and means for connecting said clutch to said switching means so that said clutch is released whenever said motor is energized and is engaged whenever said motor is not energized.

7. In a system for governing the speed of a rotating member, a first rotatably mounted element, means for rotating said element at a speed bearing a fixed ratio to the desired speed of said member, a second rotatably mounted element, rotation transmitting mechanism for rotating said second element at a speed bearing said fixed ratio to the actual speed of said member, said mechanism including a reversible electric motor having relatively rotatable armature and field structures, one of said structures being rotated by said member and the other structure rotating said second element, a plurality of electric contacts carried by one of said elements, means carried by the other of said elements for closing a first circuit through one of said contacts when the speed of said member drops below said desired speed and for closing a second circuit through another of said contacts when the speed of said member increases above said desired speed, means responsive to the closing of said first circuit for increasing the speed of said member and responsive to the closing of said second circuit for decreasing the speed of said member, switching means connected to said reversible motor and responsive to the closing of said first circuit for energizing said motor so as to cause relative rotation of said armature and field structures in a direction to increase the speed ratio of said second element relative to said member and responsive to the closing of said second circuit for energizing said motor so as to cause relative rotation of said armature and field structures in a direction to decrease the speed ratio of said second element relative to said member, and mechanical means including an irreversible worm for preventing relative rotation between said armature and field structures whenever said motor is not developing torque to cause such rotation.

8. In a system for governing the speed of a rotating member, a first rotatably mounted element, means for rotating said element at a speed bearing a fixed ratio to the desired speed of said member, a second rotatably mounted element, rotation transmitting mechanism for rotating said second element at a speed bearing said fixed ratio to the actual speed of said member, said mechanism including a reversible electric motor having relatively rotatable armature and field structures, one of said structures being rotated by said member and a gear train including a part carried by said one structure and an irreversible worm for transmitting rotation from the other structure to said second element, a plurality of electric contacts carried by one of said elements, means carried by the other of said elements for closing a first circuit through one of said contacts when the speed of said member drops below said desired speed and for closing a second circuit through another of said contacts when the speed of said member increases above said desired speed, means responsive to the closing of said first circuit for increasing the speed of said member and responsive to the closing of said second circuit for decreasing the speed of said member, and switching means connected to said reversible motor and responsive to the closing of said first circuit for causing relative rotation of said armature and field structures in a direction to increase the speed ratio of said second element relative to said member and responsive to the closing of said second circuit for causing relative rotation of said armature and field structures in a direction to decrease the speed ratio of said second element relative to said member, said gear train preventing relative rotation between said armature and field structures whenever said motor is not developing torque to cause such rotation.

9. In a system for governing the speed of a rotating member, a first rotatably mounted element, means for rotating said element at a speed bearing a fixed ratio to the desired speed of said member, a second rotatably mounted element, rotation transmitting mechanism for rotating said second element at a speed bearing said fixed ratio to the actual speed of said member, said mechanism including a reversible electric motor having relatively rotatable armature and field structures, one of said structures being rotated by said member and the other structure rotating said second element, a plurality of electric contacts carried by one of said elements, means carried by the other of said elements for closing a first circuit through one of said contacts when the speed of said member drops below said desired speed and for closing a second circuit through another of said contacts when the speed of said member increases above said desired speed, means responsive to the closing of said first circuit for increasing the speed of said member and responsive to the closing of said second circuit for decreasing the speed of said member, switching means connected to said reversible motor and responsive to the closing of said first circuit for energizing said motor so as to cause relative rotation of said armature and field structures in a direction to increase the speed ratio of said second element relative to said member and responsive to the closing of said second circuit for energizing said motor so as to cause relative rotation of said armature and field structures in a direction to decrease the speed ratio of said second element relative to said member, and means for applying electric current to fixed points in the armature of said motor whenever both of said circuits are open to magnetically lock said field and armature structures together.

10. In a system for governing the speed of a rotating member, a first rotatably mounted element, means for rotating said element at a speed bearing a fixed ratio to the desired speed of said member, a second rotatably mounted element, rotation transmitting mechanism for rotating said second element at a speed bearing said fixed ratio to the actual speed of said member, said mechanism including a reversible electric motor having relatively rotatable armature and field structures, one of said structures being rotated by said member and the other structure rotating said second element, a plurality of electric contacts carried by one of said elements, means carried by the other of said elements for closing a first circuit through one of said contacts when the speed of said member drops below said desired speed and for closing a second circuit through another of said contacts when the speed of said member increases above said desired speed, means responsive to the closing of said first circuit for increasing the speed of said member and responsive to the closing of said second circuit for decreasing the speed of said member, switching means connected to said reversible motor and responsive to the closing of said first circuit for energizing said motor so as to cause relative rotation of said armature and field structures in a direction to increase the speed ratio of said second element relative to said member and responsive to the closing of said second circuit for energizing said motor so as to cause relative rotation of said armature and field structures in a direction to decrease the speed ratio of said second element relative to said member, and means for applying electric current to fixed points in the armature of said motor whenever both of said circuits are open to return the armature to the angular position which it occupied with respect to the field before the motor was energized and to magnetically lock said armature and field structures in such position.

11. In a system for synchronizing the speeds of a plurality of rotating members, a pair of cooperating rotatably mounted elements associated with each member, an electric contact carried by one element of each pair, a pair of peripherally spaced contacts carried by the other element of each pair, means for rotating one element of each of said pairs of elements in synchronism, means for driving the other element of each of said pairs of elements by the respective rotating members, and means responsive to the closing of a circuit through any of said first-mentioned contacts and one contact of a cooperating pair of contacts for increasing the speed of the associated member and responsive to the closing of a circuit through any of said first-mentioned contacts and the other contact of a cooperating pair of contacts for decreasing the speed of the associated member, whereby all of said members are maintained in synchronism.

12. In a system for synchronizing the speeds of a plurality of rotating members, a pair of cooperating rotatably mounted elements associated with each member, a plurality of electric contacts carried by one element of each pair, means carried by the other element of each pair for closing a first circuit through one of the contacts of the cooperating element when the speed of the associated member drops below the desired synchronous speed and for closing a second circuit through another of the contacts of the cooperating element when the speed of the associated member increases above said desired synchronous speed, means for rotating one element of each of said pairs of elements in synchronism, means for driving the other element of each of said pairs of elements by the respective rotating members, means responsive to the closing of the first circuit through a contact of an element of one of said pairs for increasing the speed of the associated member and for increasing the speed of the element which is driven by said associated member with respect to the speed of the member driving it, and means responsive to the closing of the second circuit through a contact of an element of one of said pairs for decreasing the speed of the associated member and for decreasing the speed of the element which is driven by said associated member with respect to the speed of the member driving it.

13. In a system for synchronizing the speeds of a plurality of rotating members, a pair of cooperating rotatably mounted elements associated with each member, a plurality of electric contacts carried by one element of each pair, means carried by the other element of each pair for closing a first circuit through one of the contacts of the cooperating element when the speed of the associated member drops below the desired synchronous speed and for closing a second circuit through another of the contacts of the cooperating element when the speed of the associated member increases above said desired synchronous speed, means for rotating one element of each of said pairs of elements in synchronism, means for driving the other element of each of said pairs of elements by the respective rotating members, means responsive to the closing of the first circuit through a contact of an element of one of said pairs for increasing the speed of the associated member and for increasing the speed of the element which is driven by said associated member with respect to the speed of the member driving it, means responsive to the closing of the second circuit through a contact of an element of one of said pairs for decreasing the speed of the associated member and for decreasing the speed of the element which is driven by said associated member with respect to the speed of the member driving it, and means operative upon the opening of any of said circuits for changing the speed of an element with respect to the member driving it by an amount equal to and in the opposite direction from the previously effected change in speed of the element with respect to the member driving it.

14. In a system for synchronizing the speeds of a plurality of rotating members, a pair of cooperating rotatably mounted elements associated with each member, a plurality of electric contacts carried by one element of each pair, means carried by the other element of each pair for closing a first circuit through one of the contacts of the cooperating element when the speed of the associated member drops below the desired synchronous speed and for closing a second circuit through another of the contacts of the cooperating element when the speed of the associated member increases above said desired synchronous speed, a separate electric motor having a wound armature for rotating one element of each of said pairs of elements, a plurality of taps connected to spaced points on the armature of each motor, electric conductors for connecting together corresponding taps on the different motors whereby said motors run in synchronism, means for driving the other element of each of said pairs of elements by the respective rotating members, and means responsive to the closing of the first circuit through a contact of an element of one of said pairs for increasing the speed of the associated member and for increasing the speed of the element which is driven by said associated member with respect to the speed of the member driving it and responsive to the closing of the second circuit through a contact of an element of one of said pairs for decreasing the speed of the associated member and for decreasing the speed of element which is driven by said associated member with respect to the speed of the member driving it, whereby all of said members are maintained in synchronism.

15. In a system for synchronizing the speeds of a plurality of rotating members, a pair of cooperating rotatably mounted elements associated with each member, a plurality of electric contacts carried by one element of each pair, means carried by the other element of each pair for closing a first circuit through one of the contacts of the cooperating element when the speed of the associated member drops below the desired synchronous speed and for closing a second circuit through another of the contacts of the cooperating element when the speed of the associated member increases above said desired synchronous speed, a separate electric motor having a wound armature for rotating one element of each of said pairs of elements, a plurality of taps connected to spaced points on the armature of each motor, electric conductors for connecting together corresponding taps on the different motors whereby said motors run in synchronism, means for driving the other element of each of said pairs of elements by the respective rotating members, means for applying direct current across two of said electric conductors before said electric motors are started for angularly positioning each armature and the element rotated thereby so that the contacts carried by the last-mentioned elements are in angular alignment with each other, and means responsive to the closing of the first circuit through a contact of an element of one of said pairs for increasing the speed of the associated member and for increasing the speed of the element which is driven by said associated member with respect to the speed of the member driving it and responsive to the closing of the second circuit through a contact of an element of one of said pairs for decreasing the speed of the associated member and for decreasing the speed of the element which is driven by said associated member with respect to the speed of the member driving it, whereby all of said members are maintained in synchronism and in angular alignment.

16. In an engine synchronizing and phasing system for a plurality of engines, an electric motor associated with each engine, means for operating said motors in synchronism, means to compare the speed of each engine with the speed of the electric motor associated therewith, and means operative in response to variations in the speed of each engine relative to the speed of the associated electric motor to adjust the speeds of the engines to bring their shafts into predetermined angular phase relationship and to maintain the engines in synchronism with their shafts in said relationship.

17. In an engine synchronizing and phasing system for a plurality of engines, an electric motor associated with each engine, means for operating said electric motors synchronously and for maintaining their shafts in fixed angular relation to each other, and means for maintaining each engine in phase with the associated electric motor.

18. In an engine synchronizing and phasing system for a plurality of engines, an electric motor associated with each engine, means for operating said electric motors synchronously and for maintaining their shafts in fixed angular relation to each other, and means for maintaining each engine in phase with the associated electric motor, the last mentioned means comprising means to compare the speed of each engine with the speed of the electric motor associated therewith and means for controlling the speed of each engine operative in response to variations in the speed of the engine relative to the speed of the associated electric motor.

19. In an engine synchronizing and phasing system for a plurality of engines, an electric motor associated with each engine, means for operating said electric motors synchronously and for maintaining their shafts in fixed angular relation to each other, and means for maintaining each engine in phase with the associated electric motor, the last mentioned means comprising means to compare the speed of each engine with the speed of the electric motor associated therewith, means for controlling the speed of each engine operative in response to variations in the speed of the engine relative to the speed of the associated electric motor and follow-up means for preventing overregulation of the speed of each engine.

ERIC C. WAHLBERG.